3,051,640
AMINO ACID SEPARATION PROCESS

James T. Traxler, Chicago, Ill., assignor, by mesne assignments, to Armour-Pharmaceutical, a corporation of Delaware
No Drawing. Filed Sept. 21, 1959, Ser. No. 841,050
7 Claims. (Cl. 204—180)

My invention relates to a process for the purification of amino acids and more particularly to a process for the separation of amino acids by electrodialysis.

Generally, my process consists of flowing an electrical current through a multi-compartmented dialysis cell wherein the compartments are separated by selective anion and cation barrier membranes and contain an aqueous electrolyte, introducing into a central compartment an amino acid mixture; allowing the amino acids having isoelectric points at pH's above the pH of the compartment in which the amino acid mixture is introduced to migrate through the cation permeable membrane barrier and amino acids having isoelectric points at pH's below the pH of the central compartment into which the amino acid mixture is introduced to migrate toward the anode through the anion permeable membrane barrier into the next adjacent compartment. Amino acids having isoelectric points at pH's approximately the pH of the central compartment into which the amino acid mixture is introduced are retained in the central compartment. The amino acids can be removed by the usual means, for example by decantation.

A generalized set-up of an electrodialysis cell which can be used to separate acid, neutral and basic amino acids in a protein hydrolysate is shown in the following diagram:

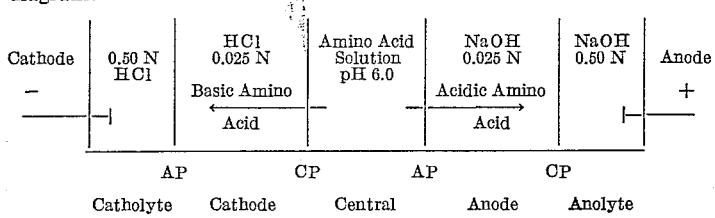

AP=anion permeable membrane.
CP=cation permeable membrane.

Only four compartments are required in my process if only two amino acids are to be separated and the pH of one of the central compartments into which the amino acid mixture is introduced is maintained at the isoelectric point pH of one of the amino acids. In such instances, the membranes forming the sides of the central compartment are both cation or anion permselective, depending upon the acids to be separated.

Various anion and cation permeable membranes are readily available and can be used in the present process invention. Such membranes may be homogeneous or heterogeneous. Heterogeneous membranes are formed by fusing various ion exchange resins with other supporting polymers having no ion exchange properties. The thin sheets of ion exchange resins used as ion barriers can contain any of the reactive radicals usually found in ion exchange resins, for example sulfonic, carboxylic and various amine radicals. These reactive radicals are attached to supporting resins, for example, polystyrene and phenol-formaldehyde resins. I prefer to utilize homogeneous sulfonic and quaternary ammonium membranes as anion and cation permeable membranes in my process.

Electrodes utilized in the dialysis apparatus can be any of the normally used inert electrodes such as, for example, graphite, carbon, platinum, silver and gold.

The amino acid mixtures which can be separated by my process include the hydrolysates obtained from various protein sources such as acid and base hydrolysates of collagen, blood, meat scraps, hair, hooves and feathers, and fermentation and beet sugar industry residues. However, any mixture of amino acids can be separated by my process. It is preferred that the amino acids to be separated have isoelectric points differing by at least one pH unit.

The concentration of the amino acid solutions being separated should be such that no precipitation of amino acids occurs during the separation procedure. Precipitation usually occurs at an amino acid concentration of from about 40 to about 50%, and is dependent upon the composition of the amino acid mixture. I have found that my process operates very efficiently at amino acid concentrations of from about 15 to about 35% and prefer to carry out my process at original amino acid concentrations of from about 25 to about 30%.

As the amino acid ions which move out of the central compartment are hydrated, there is a continual decrease in the volume of the solution in this compartment. For this reason, water must be added to this compartment in order to maintain the original amino acid concentration.

As my invention depends upon the simultaneous removal of positive and negative ions from the central compartment, these ions should be present in approximately equal amounts. Thus, an ideal amino acid mixture for use in my process would have nearly equal molar amounts of acidic and basic amino acids in order that both groups may be completely removed from the mixture. If this is not the case, there will remain, in the central compartment, the same molar excess of one amino acid component over the other component in the mixture as was present in the original hydrolysate at the termination of the separation procedure.

The pH of the electrolytes in the various compartments of the electrodialysis cell utilized in my process will vary with the mixture being separated. Thus, in a situation where a protein hydrolysate is being separated into acid, basic and neutral amino acid fractions, the pH of the central compartment, as shown in the above diagram, should be about that of the isoelectric point of the neutral acids, i.e. about 5.0 to about 7.5, but preferably about 5.5 to about 6 and optimally about 5.9, while the cathode compartments should have a lower pH and the anode compartment a higher pH than the central compartment. The cathode compartment can have a pH of about 0.5 to about 4.9 and preferably from about 1.0 to about 3.0, while the anode compartment can have a pH of from about 7.5 to about 12.5 and preferably 8 to 9. On the other hand, if a mixture of histidine, lysine and arginine is to be separated, the pH of the cathode, central and anode compartments would preferably be from about 7–8, 8–10 and 10–12 respectively. The arginine would be removed from the cathode compartment, the lysine from the central compartment and the histidine from the anode compartment in such a separation. The pH limitations set out above are not rigid. The only requirement, as to pH, is that the pH's of the cathode and anode compartments must be lower and higher respectively than that of the central compartment, preferably at least one pH unit.

As is indicated in the above diagram, it is necessary that the compartments on the cathode side of the central compartment contain an acid electrolyte and that the compartments on the anode side of the central compartment contain a base electrolyte. Both the acid and base utilized should be highly dissociated in the aqueous solvent. For this reason, I prefer to utilize non-oxidizing solutions of mineral acids, preferably hydrochloric acid, and to add alkali metal hydroxides to the catholyte and anolyte compartments respectively for this purpose.

The concentration of the electrolyte in solution in the anode and cathode compartments can be varied from about zero to about that in the anolyte and catholyte compartments. However, as the acid or base concentration in the cathode and anode compartments approaches that in the catholyte and anolyte compartments, increasing amounts of amino acid decomposition occurs. Generally speaking, a concentration of electrolyte in the anode and cathode compartments which is about one-half of that in the anolyte and catholyte compartments produces the desired separation without undue amino acid decomposition.

The range of direct electric voltages and amperages at which my process is operative varies widely. The current and voltage used in a particular separation is limited only by the amount of heat which can be removed from the system and by excessive amino acid decomposition. The barrier membranes tend to decompose at temperatures above about 60° C. at electrolyte compositions of about 2–3 normal and at correspondingly higher temperatures with lower electrolyte concentrations. On the other hand, if the voltage employed is too low, the separation process proceeds very slowly and results in amino acid degradation. The preferred level of constant direct current voltage in an uncooled system is in the range of about 0.4 to about 1.0 v. D.C./cm., and optimum results have been attained at 0.9 v. D.C./cm.

The following examples more fully illustrate my invention but it is not intended that my invention be limited to the concentrations, apparatus or mixtures shown. Rather it is intended that all equivalents obvious to those skilled in the art be included within the scope of my invention as claimed.

*Example I*

To carry out the separation of a protein hydrolysate containing about 33% solids, 85% of which were amino acids from which cystine had been removed, a tubular compartmented electrodialysis cell was assembled. Each compartment was fitted with a stirrer and the terminal compartments were also fitted with platinum electrodes having an effective diameter of 5 cm. The distance between the electrodes was 17 cm. The compartments were separated by alternating homogeneous cation and anion permselective membranes which are supporting resins containing sulfonic and quaternary ammonium groups obtained from the National Aluminate Company of Chicago, Illinois. These membrane barriers had a diameter of 5.0 cm. The cell was wired into a direct current power supply with the cathode and anode respectively protected by anion and cation permeable membranes. 100 ml. of hydrolysate was introduced into the central compartment and adjusted to pH 6 with concentrated sodium hydroxide solution. The cathode and anode compartments adjacent to the central compartment contained 0.25 N hydrochloric acid and sodium hydroxide solution, while the terminal catholyte and anolyte compartments contained 0.5 N hydrochloric acid and sodium hydroxide respectively. A constant potential of 15 volts D.C. was applied to the electrodes of the apparatus. At a current flow of about 500–600 ma. the contents of the catholyte and anolyte compartments were replaced whenever their pH's changed more than about one pH unit. At the end of about twenty hours, the current flow had dropped to about one-half of its original value indicating the removal of substantially all of the salt in the amino acid solution. At this time, all solutions except those in the central compartment were replaced and the process continued. Under these circumstances, a current flow of 200–400 ma. was obtained with a constant potential of 15 volts D.C. At the end of about twenty hours more, the solution in the anode compartment contained lysine, histidine and arginine, with traces of aspartic and glutamic acids, while that in the central compartment contained all amino acids but lysine, histidine and arginine. The cathode compartment contained aspartic and glutamic acids. At this point, the solution in the cathode compartment was replaced with 0.25 N hydrochloric acid and the process was allowed to continue. At a constant potential of 15 volts D.C., a current flow of about 50 ma. was obtained if the pH of the solutions in the anolyte and catholyte compartments was kept reasonably constant. At the end of about twenty hours more, 65% of the aspartic and glutamic acids present were in the cathode compartment along with about 60% of the glysine and a small amount of the threonine. The central compartment contained all amino acids originally present except lysine, histidine and arginine, while the anode compartment contained no appreciable amino acids.

*Example II*

Utilizing the equipment of Example I, an equimolar mixture of histidine, lysine and arginine can be separated into fractions by maintaining the pH in the central compartment at about 9.5, the pH in the cathode compartment at about 7.5 and the pH in the anode compartment at about 10.5.

*Example III*

Utilizing an electrodialysis cell having an electrode and inner compartment diameter of 17 cm., an electrode separation distance of 4.5 cm., baffles between the cathode and anode membranes, and the power source of Example I; a salt free amino acid hydrolysate of hog hair was almost completely separated to acid, base and neutral amino acid fractions in about six hours.

Now having described my invention, what I claim is:

1. In a process of separating amino acids by electrodialysis, the steps comprising maintaining a potential difference across a series of aqueous solutions of ionizable compounds contained in compartments separated alternately by selective anion and cation permeable membranes by using an anode and a cathode, introducing an amino acid mixture into a central compartment, adjusting the pH of the amino acid mixture to a pH of about the pH of the isoelectric point of at least one of the amino acids in the mixture, maintaining the solution in the compartment which is positioned towards said anode and adjacent to the central compartment and separated therefrom by a selective anion permeable membrane at a pH substantially higher than the pH of the mixture in the central compartment and maintaining the solution in the compartment which is positioned towards said cathode and adjacent to the central compartment and separated therefrom by a selective cation permeable membrane at a pH substantially lower than the pH of the solution in the central compartment.

2. In a process of separating amino acids by electrodialysis, the steps comprising maintaining a potential difference across a series of aqueous solutions of ionizable compounds, contained in compartments separated alternately by selective anion and cation permeable membranes by using an anode and a cathode, introducing an amino acid mixture containing at least one acidic amino acid, one basic amino acid and one neutral amino acid into a central compartment, adjusting the pH of the amino acid mixture to about the pH of the isoelectric point of at least one of the neutral amino acids in the mixture, maintaining the solution in the compartment which is positioned towards said anode and adjacent to the central compartment and separated therefrom by a selective anion permeable membrane, at a pH at least about one pH unit higher than the pH of the mixture in the central compartment and maintaining the solution in the compartment which is positioned towards said cathode and adjacent to the central compartment and separated therefrom by a selective cation permeable membrane at a pH of at least about one pH unit lower than the pH of the solution in the central compartment.

3. In a process of separating amino acids by electrodialysis, the steps comprising manitaining a potential difference across a series of aqueous solutions of ionizable compounds, contained in compartments separated alternately by selective anion and cation permeable membranes by using an anode and a cathode, introducing an amino acid mixture containing at least one acidic amino acid, one basic amino acid and one neutral amino acid into a central compartment and containing from about 15 to about 35% by weight amino acids into a central compartment, adjusting the pH of the amino acid mixture to about the pH of the isoelectric point of at least one of the neutral amino acids in the mixture, maintaining the solution in the compartment which is positioned towards said anode and adjacent to the central compartment and separated therefrom by a selective anion permeable membrane, at a pH at least about one pH unit higher than the pH of the mixture in the central compartment and maintaining the solution in the compartment which is positioned towards said cathode and adjacent to the central compartment and separated therefrom by a selective cation permeable membrane at a pH of at least about one pH unit lower than the pH of the solution in the central compartment.

4. In a process of separating amino acids by electrodialysis, the steps comprising maintaining a potential difference across a series of aqueous solutions of ionizable compounds, contained in compartments separated alternately by selective anion and cation permeable membranes by using an anode and a cathode, introducing an amino acid mixture containing at least one acidic amino acid, one basic amino acid and one neutral amino acid into a central compartment and containing from about 25 to about 30% by weight aminio acids into a central compartment, adjusting the pH of the amino acid mixture to about the pH of the isoelectric point of at least one of the neutral amino acids in the mixture, maintaining the solution in the compartment which is positioned towards said anode and adjacent to the central compartment and separated therefrom by a selective anion permeable membrane, at a pH at least about one pH unit higher than the pH of the mixture in the central compartment and maintaining the solution in the compartment which is positioned towards said cathode and adjacent to the central compartment and separated therefrom by a selective cation permeable membrane at a pH of at least about one pH unit lower than the pH of the solution in the central compartment.

5. In a process of separating amino acids by electrodialysis, the steps comprising maintaining a potential difference across a series of aqueous solutions of ionizable compounds, contained in compartments separated alternately by selective anion and cation permeable membranes by using an anode and a cathode, introducing an amino acid mixture containing at least one acidic amino acid, one basic amino acid and one neutral amino acid into a central compartment, adjusting the pH of the amino acid mixture to from about 5.0 to 7.5, maintaining the solution in the compartment which is positioned towards said anode and adjacent to the central compartment and separated therefrom by a selective anion permeable membrane, at a pH of from about 0.5 to 5.0 and maintaining the solution in the compartment which is positioned towards said cathode and adjacent to the central compartment and separated therefrom by a selective cation permeable membrane at a pH of from about 7.5 to 12.5.

6. In a process of separating amino acids by electrodialysis, the steps comprising maintaining a potential difference across a series of aqueous solutions of ionizable compounds, contained in compartments separated alternately by selective anion and cation permeable membranes by using an anode and a cathode, introducing an amino acid mixture containing at least one acidic amino acid, one basic amino acid and one neutral amino acid into a central compartment, adjusting the pH of the amino acid mixture to from about 5.5 to about 6.0, maintaining the solution in the compartment which is positioned towards said anode and adjacent to the central compartment and separated therefrom by a selective anion permeable membrane, at a pH of from about 1.0 to about 3.0 and maintaining the solution in the compartment which is positioned towards said cathode and adjacent to the central compartment and separated therefrom by a selective cation permeable membrane at a pH of from about 8.0 to about 9.0.

7. In a process of separating amino acids by electrodialysis, the steps comprising maintaining a potential difference across a series of aqueous solutions of ionizable compounds contained in compartments separated alternately by selective anion and cation permeable membranes by using an anode and a cathode, introducing an amino acid mixture containing histidine, lysine and arginine into a central compartment, adjusting the pH of the amino acid mixture to from about 8 to 10, maintaining the solution in the compartment which is positioned towards said anode and adjacent to the central compartment and separated therefrom by a selective anion permeable membrane, at a pH of from about 10 to 12 and maintaining the solution in the compartment which is positioned towards said cathode and adjacent to the central compartment and separated therefrom by a selective cation permeable membrane at a pH of from about 7 to 8.

References Cited in the file of this patent

UNITED STATES PATENTS

| | | |
|---|---|---|
| 2,694,680 | Katz | Nov. 16, 1954 |
| 2,835,633 | Kollsman | May 20, 1958 |

FOREIGN PATENTS

| | | |
|---|---|---|
| 104,688 | Great Britain | Mar. 10, 1921 |

OTHER REFERENCES

P. N. Campbell et al.: "The Isolation of a Toxic Substance From Agenized Wheat Flour," Biochemical Journ., vol. 48, pp. 106–13 (1951).

Durrum: Jour. of the Amer. Chem. Soc., vol. 72, July 1950, pp. 2943–2948.

Alberty: Jour. of Chem. Education, August 1948, pp. 426–433, pp. 429–430 relied upon.